(12) United States Patent
de Vries

(10) Patent No.: US 6,199,713 B1
(45) Date of Patent: Mar. 13, 2001

(54) REUSABLE CONTAINER HAVING A PROTECTIVE COATING AND METHOD FOR THE RECOVERY THEREOF

(75) Inventor: Carl Maria de Vries, Nieuwegein (NL)

(73) Assignees: Henkel Nederland B.V.; B & R Recycling B.V., both of (NL)

( * ) Notice: Subject to any disclaimer, the term of this patent is extended or adjusted under 35 U.S.C. 154(b) by 0 days.

(21) Appl. No.: 09/014,537

(22) Filed: Jan. 28, 1998

Related U.S. Application Data

(63) Continuation of application No. PCT/NL95/00262, filed on Jul. 28, 1995.

(51) Int. Cl.⁷ .................................................. B65B 3/00
(52) U.S. Cl. .................. 220/495.02; 220/62.15; 220/62.22; 220/23.91; 220/23.9
(58) Field of Search .............. 220/62.11, 62.22, 220/62.14, 495.02, 23.91

(56) References Cited

U.S. PATENT DOCUMENTS

| | | | |
|---|---|---|---|
| 3,085,375 | * | 4/1963 | Harrison ............................. 53/442 |
| 3,652,333 | * | 3/1972 | Warren ............................... 427/96 |
| 4,122,973 | * | 10/1978 | Ahern ............................. 220/495.02 |
| 4,800,845 | * | 1/1989 | Budd ............................. 220/495.02 |
| 5,051,284 | * | 9/1991 | Johansson et al. .............. 428/34.9 |
| 5,492,242 | * | 2/1996 | Gall ............................. 220/495.02 |

FOREIGN PATENT DOCUMENTS

| | | |
|---|---|---|
| 4102326 | 7/1992 | (DE) . |
| 0468244 | 1/1992 | (EP) . |
| 0579106 | 1/1994 | (EP) . |
| 9105714 | 5/1991 | (WO) . |

* cited by examiner

Primary Examiner—Paul T. Sewell
Assistant Examiner—Troy Arnold
(74) Attorney, Agent, or Firm—Ostrolenk, Faber, Gerb & Soffen, LLP

(57) ABSTRACT

A reusable container, in particular for environmentally harmful substances, such as paint, adhesive and the like, comprises a container body (1), the inside and/or outside of which is provided with a protective coating (7, 6) which consists of a material which is solvent-resistant at application temperature and at a raised temperature is soluble or softenable in a solvent, preferably water. This material is preferably polymethyl methacrylate.

11 Claims, 2 Drawing Sheets

REUSABLE CONTAINER HAVING A PROTECTIVE COATING AND METHOD FOR THE RECOVERY THEREOF

CROSS-REFERENCE TO RELATED APPLICATIONS

This is a continuation of International Application PCT/NL95/00262, with an International filing date of Jul. 28, 1995.

The invention relates to a reusable container, in particular for environmentally harmful substances, according to the preamble of claim 1.

Such a container, in particular in the form of a plastic bucket for paint, adhesive and the like, is known from German Offenlegungsschrift DE-A1-4,102,326.

After use, containers for environmentally harmful substances still contain a residue of the contents, while the outside is often covered with spilt residues of the environmentally harmful substances. These substances and containers soiled therewith are generally regarded as chemical waste, and must therefore be collected and disposed of separately. Under current legislation in this field, the percentage by weight of the environmentally harmful substances relative to the container is an important factor in determining whether or not the container is to be regarded as chemical waste.

In modern society the authorities are seeking to make the producer of environmentally harmful materials or products responsible for this disposal after use. In the case of e.g. a paint manufacturer it means that this manufacturer may be obliged to take back and collect used paint cans and buckets and to ensure environmentally acceptable processing thereof. In order to limit this quantity of waste for processing, it is in the interest of such a manufacturer only to dispose of the environmentally harmful substances, while the container body (e.g. cans or buckets) is available for reuse.

In the case of the bucket known from DE-A-4,102,326 a pull-off film is used as the protective coating on the inside and/or outside of the container body, said film being applied thereto with or without the use of an adhesive. After use, the protective coating with residues is pulled off the bucket. Ethylene vinyl acetate is mentioned as an example of a suitable film. Such buckets can be manufactured by heating the container body to a high temperature, e.g. 100° C., and then placing a preformed film of the protective coating therein under pressure. If both the container and the film are made of a thermoplastic material, the desired adhesion can be obtained by using pressure and heating.

A disadvantage of such a coating, which can be removed from the container body by pulling it away, is the risk that the coating will tear while it is being pulled away, even in the case of a relatively thick 0.2 mm film. If the container body is a complex shape, for example if it has a flanged top edge, this risk is high. It can mean that soiling of the container body itself can still occur, which is undesirable. This problem has already been recognized in DE-A-4,102,326, where it is proposed that the coating should be provided with a loop which is connected to a reinforcement strip placed in the coating, as a result of which the chance of tearing when the coating is being pulled away is counteracted. However, the disadvantages here are that the costs of the coating itself are increased, and its manufacture becomes more complicated and consequently more expensive.

A further disadvantage of this known container is that such a removal step of pulling the coating away is labour-intensive, certainly if the coating consists of several parts. Besides, mechanization of such a method is not easy to achieve. Finally, after the removal of the pull-off film, the container body will generally have to be degreased before a new peel-off coating can be applied.

WO-A-91/05714 discloses a container for Hazardous substances, in particular agrochemicals, comprising an outer shell made from compressed fibrous material, having an associated barrier of a polymeric material and an inner water soluble or water dispersible envelope for containing the contents. This envelope together with the contents can be tipped into water for further processing the contents.

EP-A-0 468 244 discloses a reusable plastic container, comprising a container body, of which the inside is provided with a plastic coating layer, which is not soluble in the intended contents of the container and which is soluble in an aqueous detergent solution. The difference in solublity of the coating material in the intended contents and the aqueous detergent solution is related to the difference of the acidity of the contents, respectively the detergent solution.

The object of the invention is to provide a reusable container to which the protective coating can be applied in a simple manner, and from which it can be removed and collected separately from the container body in a simple manner, and the costs of which are relatively low.

The features of the reusable container of the abovementioned type according to the invention are defined in the characterizing portion of claim 1.

In the context of the invention ambient temperature should be understood as the usual temperature at which the contents of the container are stored, transported and processed. Solvent-resistant should be understood as meaning that the coating material is resistant to the contents of the container and to solvents which are normally used for processing the contents. The protective coating will not dissolve, react or otherwise deteriorate at the usual processing temperature under the influence of the contents or under the influence of means used for processing the contents. Raised temperature should be understood as meaning a temperature which is higher than the normal processing temperature.

One advantage of the container according to the invention is that the protective coating can be removed in a simple manner using a heated solvent, preferably water. Such removal can be carried out quickly and completely and is simple to automate. Examples of this are washing with a heated solvent, immersion in a bath of such a solvent or spraying with a solvent under pressure. The coating material removed, with residues, can be separated from the solvent using known purification techniques or, if the concentrations of film-forming material and residues in water are sufficiently low (lower than the permissible concentration limits for discharging into the sewer), the water can be discharged directly into the sewer. Such a coating can advantageously be applied very thinly (of the order of magnitude of micrometers) to the container body, while the desired physical properties of the protective coating can still be obtained. This means that the quantity of waste material for disposal, coming from the coating itself, can be kept small.

After use of the container, both the remainder of the contents and all residues of environmentally harmful substances which have been spilt or are otherwise adhering to the outside of the container body can be removed with the coating, so that the container body is completely clean and is thus suitable for reuse through the application of a new coating thereto and subsequent refilling of the container.

Such removal of the protective coating is easily carried out by the manufacturer himself, who takes back the containers from the user after use. After removal of the protective coating, it is possible to apply a simple cleaning operation, e.g. washing and drying, if such cleaning is considered necessary.

The demands to be made of the coating material include chemical resistance, for example to the environmentally harmful substances, as already stated above, and sufficient strength to prevent damage during use. Such damage can occur if, for example, the contents of the container have to be stirred or mixed in some other way before being processed.

Preferred materials suitable for use as protective coating materials according to the present invention include acrylic-based polymers or resins.

It is also advantageous for the outer coating to be transparent. This makes it possible to print the outside of the container body once, for example with a brand name and/or data concerning the contents of the container, without such data having to be applied to the outer coating. Since this coating part is transparent, the outside of the container body, and consequently these data, always remain visible.

A material which is particularly preferred is polymethyl methacrylate (PMMA). PMMA is a clear, colourless, transparent plastic having a high softening point, good impact strength and good weather resistance. This material can also be applied as a thin film to the container body by conventional techniques such as pouring, immersion and/or spraying. The low relative density of PMMA, combined with the low thickness of the film layer has a beneficial effect on the quantity of waste to be processed.

PMMA softens at 70° C. and at this temperature will come away from the container body and form a gelatinous sheet which is simple to remove from the solvent, for example water. A simple separation of the PMMA sheet from the water is possible through the fact that this sheet floats on the water. PMMA is also resistant to many aqueous, inorganic reagents, including dilute bases and acids, and to normally used organic solvents.

The protective inner coating of the container can be in the form of a bag or pre-shaped film placed loose in the container. Said protective inner coating can also be immovably connected to the container, in order to reduce the risk of damage during use. Moreover, the outer coating and the inner coating can be of separate parts, which is advantageous if only the inner coating needs to be removed, because the outside of the container has not been soiled with the contents thereof. In order to protect the container completely, in such a case the inner and outer coating join up with each other in a sealing manner.

Compared with the method of manufacture described in DE-A-4,102,326, which is in two steps, namely forming a pre-shaped film and then fixing said film in the container body, the present container has the advantage that the protective coating can be applied to the container body. in one step.

In certain cases, depending on the application, it may be necessary to select a different material with better resistance to mechanical stress for the protective inner coating. Examples of this are polypropylene, polyethylene terephthalate and comparable inert plastics. A preferred combination is an outer coating of PMMA and an inner coating of polyethylene terephthalate (PET). The PET coating can be placed loose in the container or can be fixed to the container by means of adhesive. The outer coating preferably overlaps the inner coating at the inside of the container over a distance large enough to prevent undesirable pollutants from penetrating between the inner coating and the inside wall of the container. The overlap at the inside of the container is better from the point of view of weight and adhesion than an overlap at the outside, because the soluble or softenable material according to the invention is easier to apply to the edge (flange) of the container than the more rigid PET material.

The nature of the container body itself is not critical for the invention, but it will usually be made of plastic or metal.

Secondly, the invention relates to a method for recovering reusable containers according to the invention, which method is characterized in that the container is subjected to a treatment with a solvent, preferably with water, at elevated temperature, the protective coating is removed from the container body, and the container body and the solvent containing the protective coating are separated from each other.

If a container with a PET inner coating and a PMMA outer coating or comparable materials is used, the PET inner coating with the residual content is first removed, before the treatment with solvent is carried out. The PET inner coating and the residual contents can be separated from each other by, for example, cryogenic techniques.

The invention will be explained below with reference to the appended drawing, in which.

Figure 1:
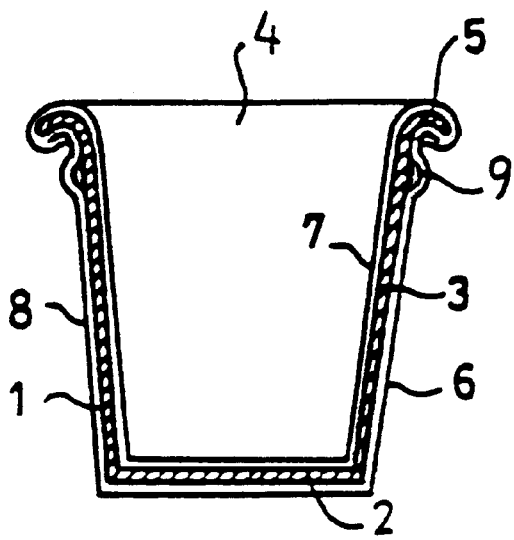
FIG. 1 is a cross-section of an embodiment of a container according to the invention.

FIG. 1 shows a container according to the invention which comprises a container body 1. The container body 1 comprises a bottom 2 and a wall 3 rising from the bottom, and an opening 4 lying opposite the bottom 2. The container body 1 comprises an edge 5 at the top side of the wall 3 beside the opening 4. The coating, indicated in general by reference number 6, in the embodiment shown here consists of an inner coating 7 and an outer coating 8, both of which are applied by spraying PMMA onto the container body 1, and which are immovably connected thereto. For reasons of clarity, the coatings in the figure are shown exposed. The inner coating 7 overlaps the outer coating 8 at the outside of the container body at the position of the edge 5, so that the two coatings 7 and 8 join up with each other in a sealing manner. As a result of this design of the coating parts 7 and 8, the container body 1 is completely protected.

In the case of the container shown in FIG. 1 the protective coating is formed in two parts, in order to make it possible to remove only the soiled inner coating 7 after use, by means of a solvent at high temperature, while the outer coating 8, if it is not soiled, remains behind on the container body 1. The stream of waste to be processed can be limited further in this way. It is also possible to manufacture the inner and outer coating in different thicknesses, because the physical demands made of the coating are different for the two positions. Optimum adaptation to these demands and to the contents of the container can easily be made by the person skilled in the art.

As shown in FIG. 1, the outside of the container body 1 comprises a protuberance 9 in the vicinity of the edge 5. The function of this protuberance 9 is explained further with reference to FIGS. 2 and 3.

Figure 2:
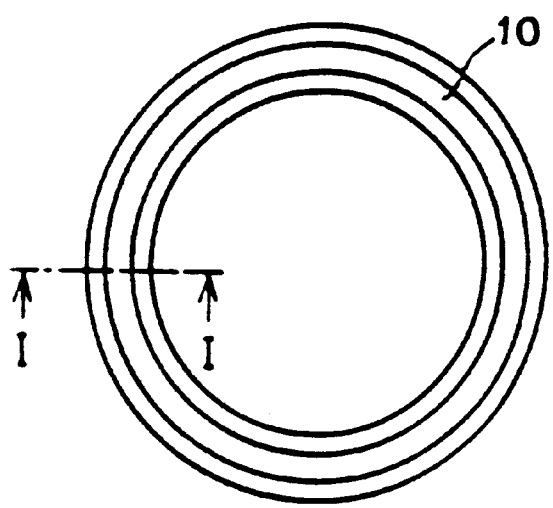
FIG. 2 is a top view of a closing element for the container of FIG. 1.

In order to be able to seal the container body 1, which is provided with a protective outer coating 8, without damaging said protective coating, a closing element 10, in the form of an annular locking element, can be used. A top view of such a closing element is shown in FIG. 2. The closing element 10 is pushed from the underside onto the container body 1 having the outer coating 8 until it passes the protuberance 9. The protuberance 9, in combination with the edge 5, ensures the positioning of the closing element 10. The locking element 10 is in a tight fit around the container body 1.

Figure 3:
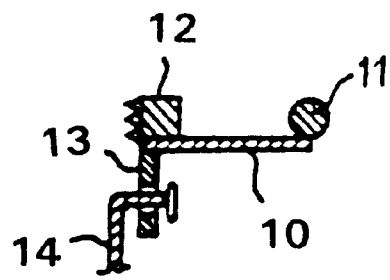
FIG. 3 is a cross-section along the line I—I of the closing element shown in FIG. 2.
Figure 4:
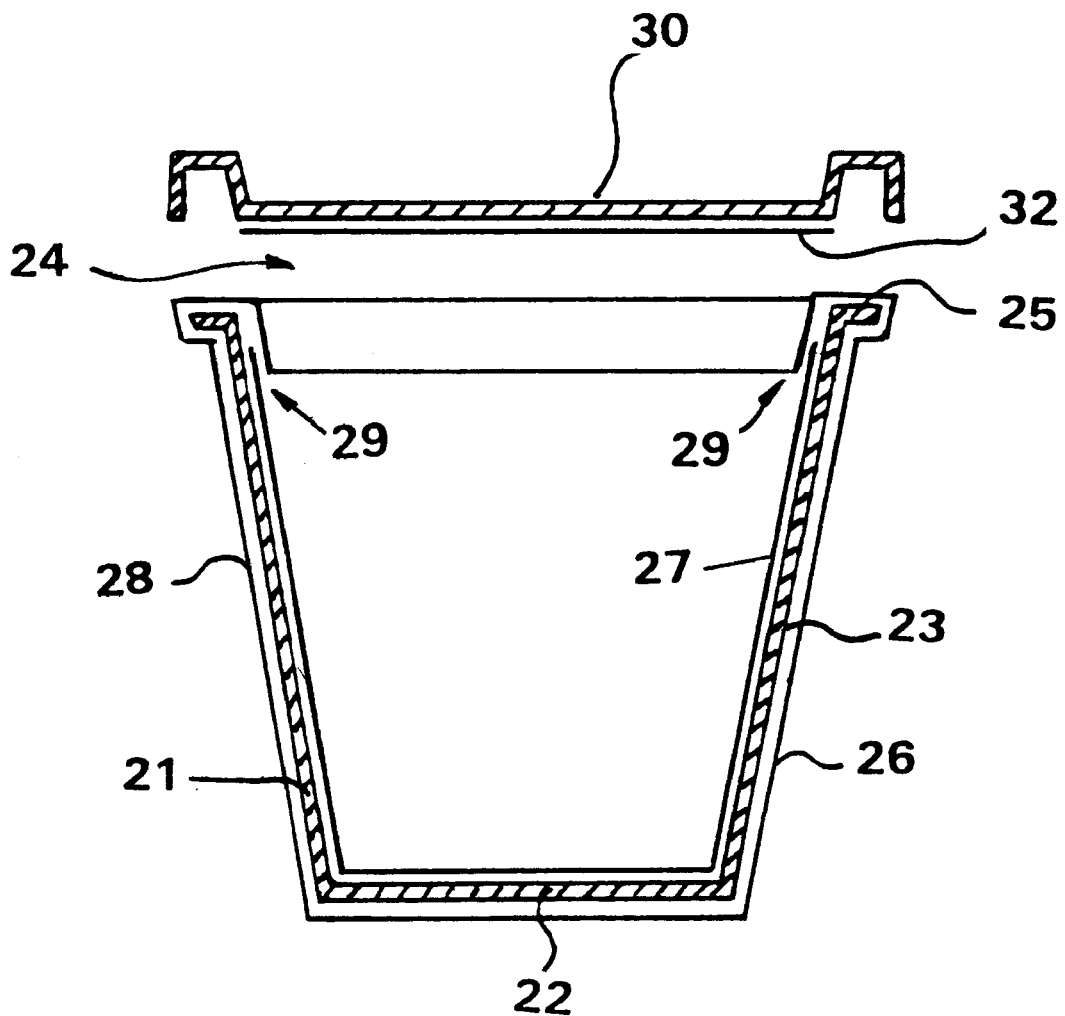
FIG. 4 is a cross-section of a second embodiment of a container with cover according to the invention.

FIG. 3 shows in detail a section along the line I—I of the closing element of FIG. 4. The annular locking element 10 is provided with a clamping element 11 on the inside. The clamping element 11 is preferably made of a slightly elastic material, so that it is easily pushed over the protuberance 9. The shape of the clamping element 11 is adapted to the shape of the bottom edge 5. If the bottom edge 5 is a round shape, as shown in FIG. 1, the part of the clamping element 11 of the closing element 10 which is in contact therewith, will also be a round shape.

In the section of the closing element 10 shown, the outer periphery thereof is provided with a threaded element 12, on to which a screw cover (not shown) can be screwed in a simple manner, in order to shut off the opening 4 of the container. As can also be seen from this figure, the closing element 10 has on the underside of the element 12 a flange 13, to which a handle 14 is fixed. In this way the container is easy to transport by the end user, while the protective coating remains intact.

It will be clear that if the container body at the opening side 4 does not have a bottom edge 5 against which the closing element 10 can rest in a tight fit, it is possible to provide two protuberances on the outside, between which the closing element is positioned. This makes it possible to shut off the container in a similar way to that described above, by means of a cover which is screwed onto the closing element. Another example for shutting off the opening of the container body is a snap-on cover, which is snapped over the closing element. In this case it is, of course, not possible to provide the closing element with screw thread.

As will be understood by the person skilled in the art, the snap-on or screw cover can also advantageously be provided with a protective coating of a material which at ambient temperature is solvent-resistant, and which at raised temperature can be dissolved or softened in the solvent.

A second embodiment of a reusable container according to the invention is shown in FIG. 4. A container body 21 comprises a bottom part 22 and an upright side wall 23 having an opening at the top side of the container body 21 indicated by reference number 24. The opening 24 is bounded by a peripheral edge 25 at the top side of the side wall 23. The container body 21 is completely covered by a coating 26, consisting of two different materials. An inner coating 27 of PET protects the inside of the container body 21, and a PMMA coating 28 protects the entire outside of the container body 21. As can be seen clearly from this figure, the outer coating 28 overlaps the inner coating 27 on the inside of the container body 21 over a certain distance (indicated by arrow 29), in order to prevent the inside of the container body from becoming soiled. The container also comprises a snap-on lid 30, which is provided with a protective PMMA coating on the underside thereof.

When the protective coatings are being removed, the PET inner coating with the residual contents will first be removed in a conventional manner, following which the PMMA coating of the cover and the container body is removed using water at a temperature of, for example, 60–70° C. This coating forms a gel in the water, which gel floats on the water and is thus easily separated. The PET coating with the remainder of the contents is subjected to a thermal treatment with liquid nitrogen, during which the PET coating is cooled so much that these different materials come apart. The PET pieces are collected and can be reused.

What is claimed is:

1. Reusable container for environmentally harmful substances, comprising a container body having an outside and an inside, an inner protective coating on the inside of the container body and an outer protective coating on the outside of the container body, wherein at least the outer protective coating is made of a material, which is solvent-resistant and water-resistant at ambient temperature and which is water-soluble or water-softenable at a raised temperature above ambient.

2. Reusable container according to claim 1, wherein the material of at least the outer protective coating is selected from acrylic-based polymers or resins.

3. Reusable container according to claim 2, wherein the material of at least the outer protective coating is transparent.

4. Reusable container according to claim 2, wherein the material of at least the outer protective coating is polymethyl methacrylate.

5. Reusable container according to claim 1, wherein the protective inner coating is immovably connected to the container body.

6. Reusable container according to claim 1, wherein the protective inner coating is placed loose in the container body.

7. Reusable container according to claim 1, wherein the outer coating overlaps the inner coating on the inside of the container body.

8. Reusable container according to claim 1, wherein the protective inner coating is made of a plastic with high resistance to mechanical stress.

9. Reusable container according to claim 8, wherein the protective inner coating is made of polyethylene terephthalate.

10. Reusable container according to claim 1, wherein the container body is comprised of a plastic or metal material.

11. Reusable container according to claim 1, wherein the container also comprises a cover, the cover including an underside, at least the underside of the cover is provided with a protective coating comprised of a material which at ambient temperature is water-resistant, and which at a raised temperature above ambient is soluble or softenable in water.

* * * * *